United States Patent
Fujita et al.

(10) Patent No.: US 6,225,842 B1
(45) Date of Patent: May 1, 2001

(54) CONTROL DEVICE WITH FORCED OPERATION FUNCTION AND SEMICONDUCTOR INTEGRATED CIRCUIT DEVICE

(75) Inventors: Hiroyuki Fujita; Koichi Inoue, both of Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/319,930

(22) PCT Filed: Jan. 9, 1998

(86) PCT No.: PCT/JP98/00076

§ 371 Date: Jun. 17, 1999

§ 102(e) Date: Jun. 17, 1999

(87) PCT Pub. No.: WO98/31085

PCT Pub. Date: Jul. 16, 1998

(51) Int. Cl.[7] .............................................. H02J 1/00
(52) U.S. Cl. .................................. 327/135; 327/530
(58) Field of Search ................................. 327/100, 107, 327/135, 166, 176, 89, 64, 225, 563, 564, 565, 530; 326/101

(56) References Cited

U.S. PATENT DOCUMENTS 5,528,125 * 6/1996 Marshall et al. ................... 323/222
5,666,066 * 9/1997 Jo ....................................... 324/772
5,982,209 * 11/1999 Magazzu' et al. ................. 327/144

FOREIGN PATENT DOCUMENTS

| 58-207648 | 12/1983 | (JP) . |
| 3-137581 | 6/1991 | (JP) . |
| 7-241040 | 9/1995 | (JP) . |

\* cited by examiner

Primary Examiner—My-Trang Nuton
(74) Attorney, Agent, or Firm—Arent Fox Kintner Plotkin & Kahn, PLLC

(57) ABSTRACT

A control device having a forced operation function has an output circuit that operates in response to an output control signal generated within the control device and a terminal for feeding a signal from the output circuit to outside the control device. The control device further has a signal detection circuit that outputs a forced operation signal when a predetermined signal is fed from the outside to that terminal. The output control signal generated within the control device and the forced operation signal produced by the signal detection circuit are fed through an OR circuit to the output circuit. This circuit configuration makes it possible to reduce the number of terminals to be provided in a control device having a forced operation function and thereby reduce its costs.

5 Claims, 3 Drawing Sheets

CONTROL DEVICE WITH FORCED OPERATION FUNCTION AND SEMICONDUCTOR INTEGRATED CIRCUIT DEVICE

TECHNICAL FIELD

The present invention relates to a control device having a forced operation function by which an output circuit provided within the control device so as to operate in response to an output control signal generated within the control device is forcibly activated from the outside, and to a semiconductor integrated circuit device having such a control device.

BACKGROUND ART

A conventional control device having a forced operation function will be described with reference to FIG. 3. FIG. 3 is a circuit diagram showing, in particular, that portion of the control device which operates in response to an output control signal S1. The output control signal S1 is, for example, an interruption signal as generated by a control circuit (not shown). The output control signal S1 is fed through an OR circuit 1 to a number n of output circuits C1–Cn.

The output circuits C1–Cn are, for example, buffer circuits, delay circuits, or triangular wave generating circuits. There are provided as many output circuits C1–Cn as are required by a personal computer or the like that is connected to terminals T1–Tn so as to be controlled by the control device. In response to the output control signal S1, the output circuits C1–Cn generate signals, such as signals delayed by a predetermined length of time or triangular waves, and feed those signals out via the terminals T1–Tn.

To make testing of the operation of the output circuits C1–Cn possible, the control device is provided with a switch terminal T0. The switch terminal T0 is connected to the non-inverting input terminal (+) of a comparator 2. At its inverting input terminal (–), the comparator 2 receives a voltage higher by a predetermined voltage Vref than the ground level.

When a voltage higher than the voltage Vref is applied to the terminal T0, the comparator 2 outputs a high level and thereby generates a forced operation signal S2. The output control signal S1 and the forced operation signal S2 are fed to an OR circuit 1, and therefore, as long as the OR circuit 1 is receiving at least one of those two signals, it outputs a high level. This makes it possible to operate the output circuits C1–Cn forcibly and thereby test their operation.

However, this conventional control device (FIG. 3) requires provision of an extra terminal, specifically the switch terminal T0. Moreover, to provide the switch terminal T0, it is inevitable to provide an extra wire pad (i.e. an electrode provided on a chip for connection with a wire). This leads to an increase in the chip size and thus in the manufacturing costs. For this reason, in ICs (integrated circuits) having a relatively few number of terminals, it is impossible to provide a switch terminal, and thus the control devices provided in such ICs cannot be operated forcibly.

DISCLOSURE OF THE INVENTION

An object of the present invention is to provide a control device having a forced operation function that does not require provision of an additional terminal, and to provide a semiconductor integrated circuit device having such a control device.

To achieve the above object, according to one aspect of the present invention, a control device is provided with: an output circuit that operates in response to an output control signal generated within the control device; a terminal for feeding a signal from the output circuit to outside the control device; and signal detection means for producing a forced operation signal with which the output circuit is forcibly operated when a predetermined signal is fed from the outside to the terminal.

According to another aspect of the present invention, a semiconductor integrated circuit device is provided with: an OR circuit that receives an output control signal generated within the semiconductor integrated circuit device; an output circuit that operates in response to the output of the OR circuit; a terminal for feeding a signal from the output circuit to outside the semiconductor integrated circuit device; a comparator for comparing a signal fed from the outside to the terminal with a predetermined voltage; and means for feeding the output of the comparator to the OR circuit.

In the control device and the semiconductor integrated circuit device described above, for example, when a signal having a predetermined voltage is fed from the outside to the above-mentioned terminal, the signal detection means, which is realized by the use of a comparator or the like, detects the signal and generates a forced operation signal. The forced operation signal and the output control signal are fed, for example, to an OR circuit, and the output of the OR circuit is fed to an output circuit such as a buffer circuit. This makes it possible to operate the output circuit forcibly in response to the signal fed from the outside. Moreover, since it is not necessary to provide an additional terminal, there is no need to increase the chip size at extra costs.

The semiconductor integrated circuit device described above may be additionally provided with overcharge detection means for detecting overcharge of a battery, so that, when the voltage of the battery is higher than a overcharge voltage, the overcharge detection means feeds the output control signal to the OR circuit.

With this semiconductor integrated circuit device, it is possible to monitor the voltage of, for example, a lithium-ion battery, so that, when the voltage reaches an overcharge voltage, the overcharge detection means, which is realized by the use of a comparator or the like, outputs the output control signal. The output circuit is, for example, a delay circuit that, in response to the output control signal, generates a delayed signal to be used, for example, to inhibit the use of the battery. In a semiconductor integrated circuit device such as a power-source monitoring IC used to monitor the status of a battery for safety's sake, by making the IC generate an output control signal when the voltage of the battery reaches the overcharge voltage, it is possible, for example by the use of an unresponsive circuit, to feed a personal computer or the like with a signal that determines the timing with which the personal computer or the like is turned off sequentially.

BEST MODE FOR CARRYING OUT THE INVENTION

<The First Embodiment>

Figure 1:
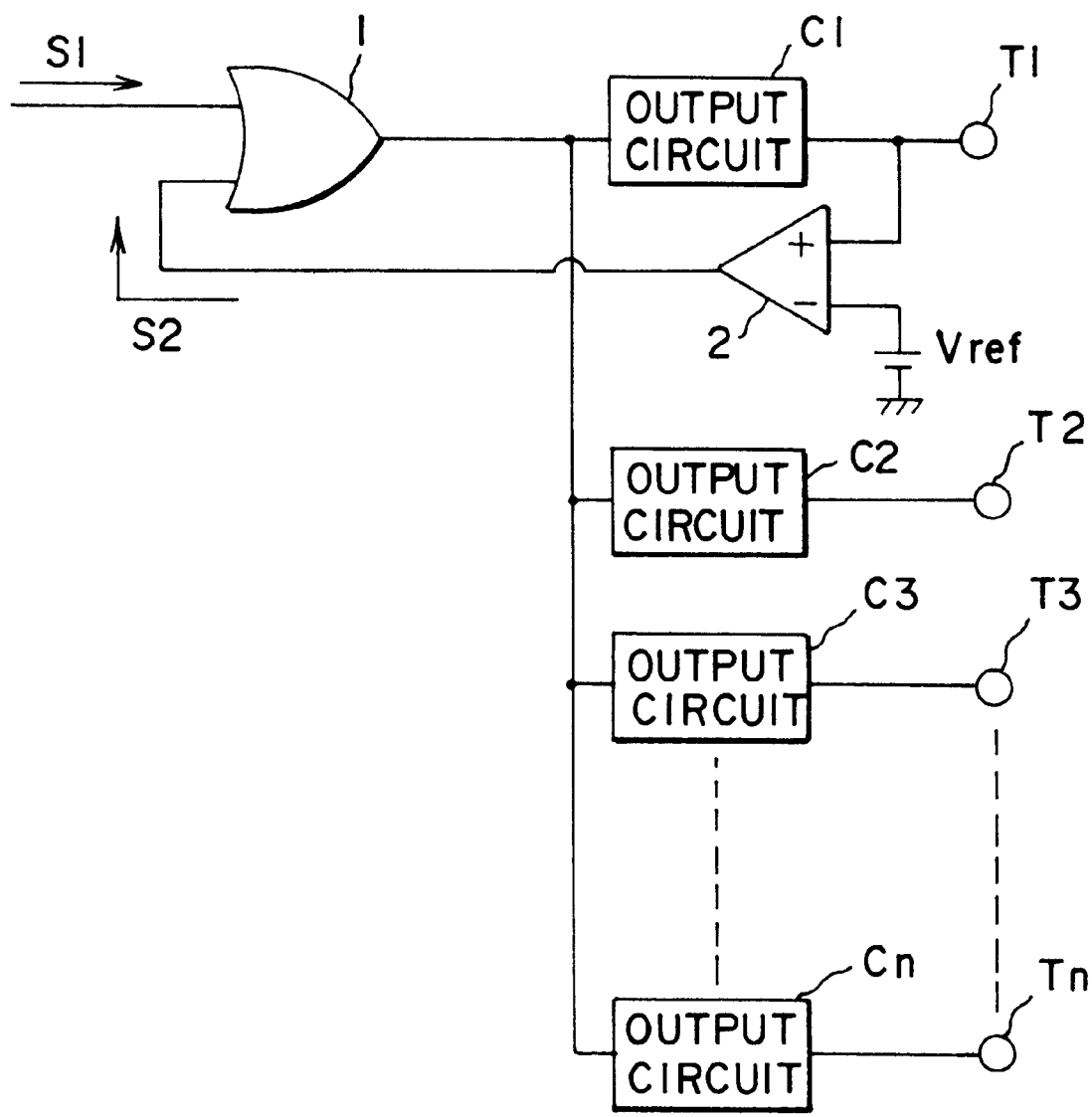
FIG. 1 is a circuit diagram of the control device of a first embodiment of the present invention.
Figure 3:
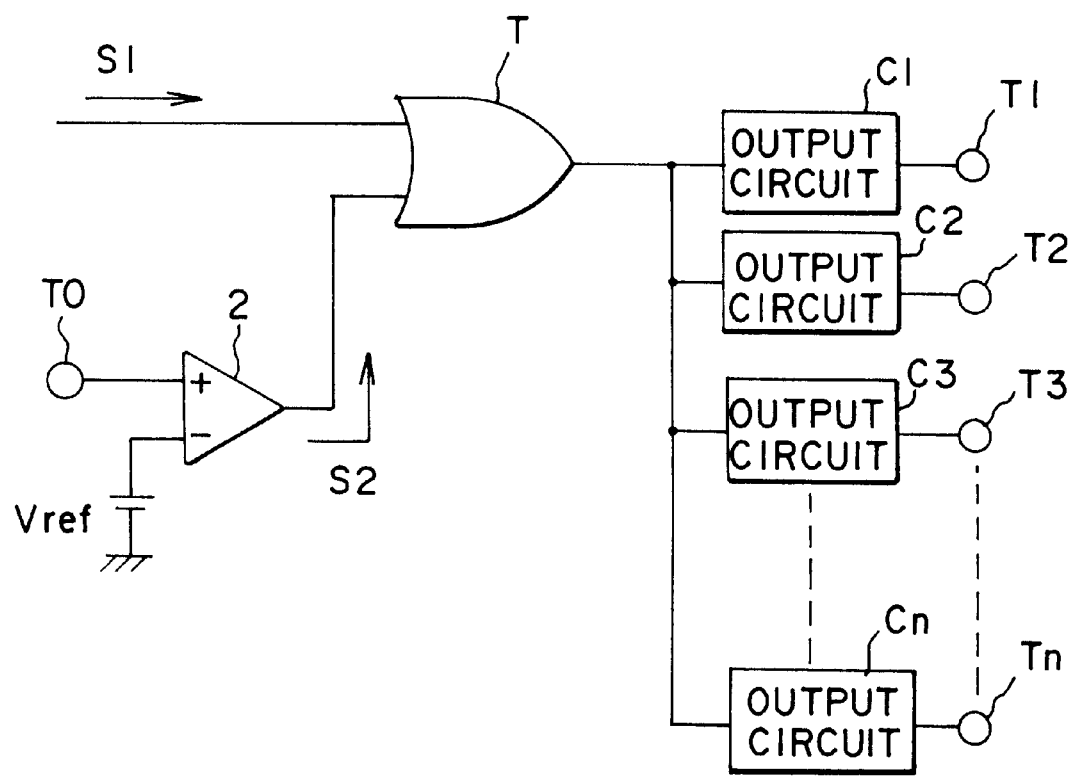
FIG. 3 is a circuit diagram of a conventional control device having a forced operation function.

A first embodiment of the present invention will be described with reference to FIG. 1. FIG. 1 is a circuit diagram of the output section of a typical control device having a forced operation function according to this embodiment. Note that, in FIG. 1, such elements as are found also in FIG. 3 are identified with the same reference symbols.

Here, the output control signal S1 serves, for example, as an overcharge detection signal for detecting overcharge of the later-described battery. When the output control signal S1 is generated in a control circuit (not shown), the signal S1 is fed through an OR circuit 1 to a number n of output circuits C1–Cn. The output circuits C1–Cn are, for example, buffer circuits, delay circuits, or triangular wave generating circuits. There are provided as many output circuits as are required by the device connected to terminals T1–Tn so as to be controlled by the control device. The signals output from the output circuits C1–Cn are fed out via the terminals T1–Tn, respectively.

As described earlier, when the operation of the output circuits C1–Cn is tested, a signal is fed from the outside to generate a forced operation signal S2. For this purpose, in this embodiment, a comparator 2 is provided as a signal detection means, and the terminal T1 is connected to the non-inverting input terminal (+) of the compactor 2. At its inverting input terminal (−), the comparator 2 receives a voltage higher by a predetermined voltage Vref than the ground level.

When a signal having a voltage higher than the voltage Vref is applied to the terminal T1 from the outside, the comparator 2 outputs a high level that acts as the forced operation signal S2. If the voltage Vref is set to be higher than the voltage of the signal output from the output circuit C1, the signal output from the output circuit C1 does not cause the forced operation signal S2 to be generated.

The signal S2 is first fed to the OR circuit 1, and is then fed therefrom to the output circuits C1–Cn. This brings the output circuits C1–Cn into the same state as when they are fed with the output control signal S1, and thereby makes it possible to test the operation of the output circuits C1–Cn under the same conditions as when the signal S1 is present.

As the comparator 2, any circuit, such as a circuit that simply detects a pulse, can be used as long as it can detect the predetermined signal fed to the terminal T1. Moreover, the control device may be so configured as to generate the signal S2 when a predetermined signal is fed to a plurality of terminals.

In the control device of this embodiment, there is no need to provide a switch terminal T0 as is required in the conventional control device (FIG. 3) described earlier, and therefore there is no need to provide an additional terminal; accordingly, there is no need to provide an additional wire pad. As a result, it is not necessary to increase the chip size at extra costs. Moreover, it is not necessary, even in an IC having a comparatively small number of terminals, to additionally provide a switch terminal T0.

<The Second Embodiment>

Figure 2:
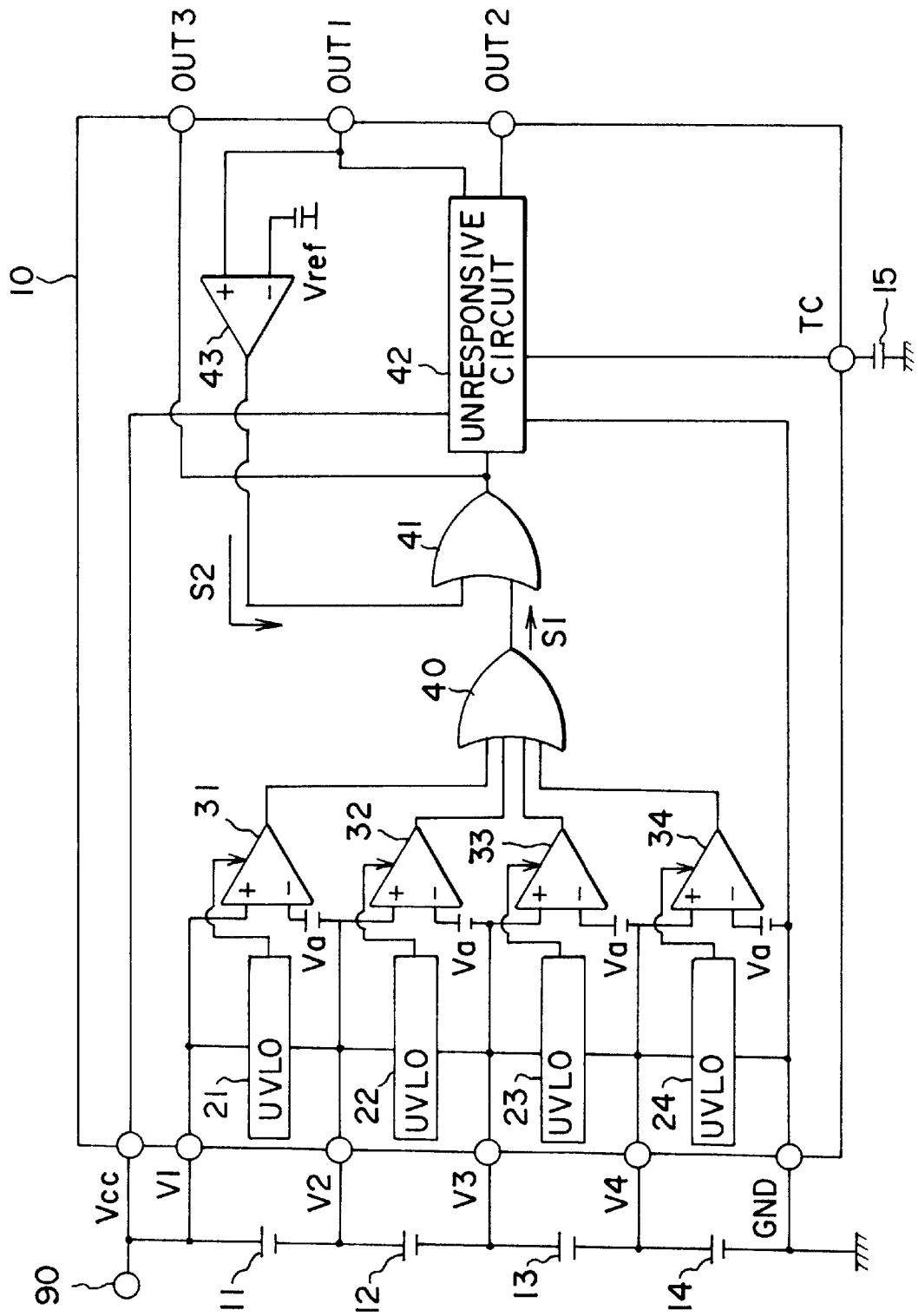
FIG. 2 is a circuit diagram of the power-source monitoring semiconductor integrated circuit device of a second embodiment of the present invention.

A second embodiment of the present invention will be described with reference to FIG. 2. FIG. 2 is a circuit diagram of a power-source monitoring IC (integrated circuit) 10 incorporating the control device (FIG. 1) of the first embodiment described above. This power-source monitoring IC 10 is used to monitor lithium-ion batteries 11 to 14 to prevent smoking or the like due to overcharge thereof.

Four lithium-ion batteries 11 to 14 are connected in series in this order from the higher-potential side, and these batteries 11 to 14 supply electric power, for example, to a personal computer (not shown) via a terminal 90. The higher-potential side of the battery 11 is connected to terminals VCC and V1 of the power-source monitoring IC 10. The node between the batteries 11 and 12 is connected to a terminal V2. The node between the batteries 12 and 13 is connected to a terminal V3. The node between the batteries 13 and 14 is connected to a terminal V4. The lower-potential side of the battery 14 is connected to a terminal GND, and is grounded so as to have a level equal to the ground level.

Between the terminals V1 and V2 is connected a UVLO (under-voltage lockout circuit) 21. The UVLO 21 compares the voltage between the terminals V1 and V2 with a predetermined voltage by the use of a comparator or the like. When the voltage between the terminals V1 and V2 is lower than the predetermined voltage, the UVLO 21 turns on a comparator 31. This prevents the power-source monitoring IC from being destroyed by an overvoltage.

The comparator 31 serves as an overcharge detection means. The comparator 31 has its non-inverting input terminal (+) connected to the terminal V1, and receives, at its inverting input terminal (−), a voltage higher by a voltage Va than the voltage at the terminal V2. As a result, the comparator 31, as long as it is in the on state, checks whether the voltage of the battery 11 is higher than the overcharge voltage or not. It is generally considered that a lithium-ion battery 11 has a voltage between 2.3 V to 4.2 V in normal use. Accordingly, by setting the overcharge voltage, for example, at 4.3 V, if the voltage of the battery 11 is higher than the overcharge voltage, the comparator 31 outputs a high level; by contrast, if the voltage of the battery 11 is lower than the overcharge voltage, the comparator 31 outputs a low level.

In the same manner as the UVLO 21 and the comparator 31 described above, between the terminals V2 and V3 are provided a UVLO 22 and a comparator 32. The UVLO 22 is connected to the terminals V2 and V3. The comparator 32 has its non-inverting input terminal (+) connected to the terminal V2, and receives, at its inverting input terminal (−), a voltage higher by the voltage Va than the voltage at the terminal V3. As a result, if the voltage of the battery 12 is higher than the overcharge voltage, the comparator 32 outputs a high level; by contrast, if the voltage of the battery 12 is lower than the overcharge voltage, the comparator 32 outputs a low level.

In the same manner as the UVLO 21 and the comparator 31 described above, between the terminals V3 and V4 are provided a UVLO 23 and a comparator 33. The UVLO 23 is connected to the terminals V3 and V4. The comparator 33 has its non-inverting input terminal (+) connected to the terminal V3, and receives, at its inverting input terminal (−), a voltage higher by the voltage Va than the voltage at the terminal V4. As a result, if the voltage of the battery 13 is higher than the overcharge voltage, the comparator 33 outputs a high level; by contrast, if the voltage of the battery 13 is lower than the overcharge voltage, the comparator 33 outputs a low level.

In the same manner as the UVLO 21 and the comparator 31 described above, between the terminals V4 and GND are provided a UVLO 24 and a comparator 34. The UVLO 24 is connected to the terminals V4 and GND. The comparator 34 has its non-inverting input terminal (+) connected to the terminal V4, and receives, at its inverting input terminal (−), a voltage higher by the voltage Va than the ground level. As a result, if the voltage of the battery 14 is higher than the overcharge voltage, the comparator 34 outputs a high level; by contrast, if the voltage of the battery 14 is lower than the overcharge voltage, the comparator 34 outputs a low level.

The outputs of the comparators 31 to 34 are fed to an OR circuit 40. As a result, when all of the batteries 11 to 14 are judged to have voltages below the overcharge voltage, the OR circuit 40 outputs a low level; by contrast, if any of the batteries 11 to 14 is judged to have a voltage higher than the overcharge voltage, the OR circuit 40 outputs a high level, which acts as the output control signal S1 indicating detection of overcharge. The output control signal S1 is fed through the OR circuit 41 to an unresponsive circuit 42, and also, after passing through the OR circuit 41, to a terminal OUT3.

The unresponsive circuit 42 is a circuit that outputs a signal fed thereto with a delay. The unresponsive circuit 42 is fed with electric power by being connected to the terminals VCC and GND. The delay time is set by a capacitor 15 that is connected to a terminal TC. For example, the unresponsive circuit 42 feeds a constant current to the capacitor 15 so that the length of the time that the capacitor takes to be charged up to a predetermined voltage is used as the delay time.

After the lapse of the delay time, the unresponsive circuit 42 outputs the signal fed thereto to terminals OUT1 and OUT2. Note that the delay time for the signal output to the terminal OUT1 and the delay time for the signal output to the terminal OUT2 may be equal to, or different from, each other. Thus, in response to the output control signal S1, the unresponsive circuit 42 outputs the signal fed thereto via the terminals OUT1 to OUT3 with different delays.

For example, in a case where a personal computer (not shown) operates on the electric power supplied from the batteries 11 to 14, even when the voltage of any of the batteries 11 to 14 exceeds the overcharge voltage, if the entire personal computer is turned off immediately, the data stored in RAM (random access memory) will be lost.

To avoid this, when the entire personal computer is turned off, it is necessary to save the data stored in RAM or the like to a magnetic disk or the like first, and then turn off the entire personal computer. By the use of the signals obtained from the terminals OUT1 to OUT3, it is possible to turn off the personal computer with appropriate timing. In this way, the signals obtained from the terminals OUT1 to OUT3 are not for use within the power-source monitoring IC 10, but for use by a personal computer or the like that is connected to the power-source monitoring IC 10.

As described earlier, the unresponsive circuit 42 sometimes needs to be operated forcibly from the outside for operation testing or the like. For this reason, the non-inverting input terminal (+) of the comparator 43 is connected to the terminal OUT1. The comparator 43 receives, at its inverting input terminal (−), a voltage higher by a voltage Vref than the ground level. As a result, when a signal having a voltage higher than the voltage Vref is fed to the terminal OUT1, the comparator 43 outputs a high level, which acts as the forced operation signal S2.

The forced operation signal S2 is fed to the OR circuit 41. Since the OR circuit 41 does not distinguish between the signals S1 and S2 when it outputs one of them, this allows the same operation as when the output control signal S1 is received from the OR circuit 40 to be performed forcibly from the outside.

By varying the capacitance of the capacitor 15, it is possible to set the delay time freely. The capacitor 15 may be incorporated in the power-source monitoring IC 10. A comparator serving as a signal detection means, like the comparator 43 connected to the terminal OUT1, may be connected, for example, also to the terminal OUT2.

In this embodiment, the terminal OUT1 can be used also as a switch terminal for forcibly operating the unresponsive circuit 42 within the power-source monitoring IC 10, and thus there is no need to provide an additional terminal. Since the forced operation function is not used so frequently in the power-source monitoring IC 10, except for operation testing, it is convenient for the power-source monitoring IC 10 that the forced operation function is achieved without the provision of an additional terminal.

Moreover, although the above descriptions, given with reference to FIG. 2, deal with a case where the power-source monitoring IC 10 is provided with a function for detecting overcharge, it is also possible to provide the power-source monitoring IC 10 with a function for detecting overdischarge or overcurrent of the batteries 11 to 14. To detect overdischarge, for example, an additional comparator (not shown) is connected in parallel with the comparator 31. By feeding a voltage corresponding to but having a different voltage from the voltage Va to the non-inverting input terminal (+) of this additional comparator, it is possible to check if the voltage of the battery 11 is lower than the overdischarge voltage or not. The overdischarge voltage is, for example, 2.3 V.

Also for the batteries 12 to 14, additional comparators are connected in parallel with the comparators 32 to 34, and the outputs of these additional comparators are fed to an AND circuit to obtain a discharge permitting signal. If this discharge permitting signal is not available, the personal computer is turned off in the manner as described above.

To detect overcurrent, for example, resistors (not shown) are additionally connected in series with the batteries 11 to 14, and the voltage drops across those resistors are monitored. This makes it possible to turn off the personal computer in the manner as described above when a current exceeding a predetermined level is flowing.

Industrial Applicability

As described above, according to the present invention, it is possible to realize a control device having a forced operation function, and also a semiconductor integrated circuit device having such a control device, without the provision of an additional terminal. This makes it unnecessary to increase the chip size at extra costs. Thus, the present invention is suitably applied to a semiconductor integrated circuit device such as a power-source monitoring IC that monitors the voltage of a battery and, when the battery voltage is abnormal, generates an output control signal internally so as to control an output circuit in accordance with the output control signal and thereby output a timing signal and that needs to be operated forcibly in response to a signal fed from the outside to check whether its output circuit is operating normally or not.

What is claimed is:

1. A semiconductor integrated circuit device comprising:
   an OR circuit that receives a control signal generated within the semiconductor integrated circuit device;
   an output circuit that is activated by an output of the OR circuit;
   a terminal for feeding a signal from the output circuit to outside the semiconductor integrated circuit device;
   a comparator for comparing with a predetermined voltage a test signal fed from outside to the terminal to test the output circuit when the control signal is not being generated; and means for feeding an output of the comparator to the OR circuit.

2. A semiconductor integrated circuit device as claimed in claim 1, further comprising:

overcharge detection means for detecting overcharge of a battery, wherein, when a voltage of the battery is higher than a overcharge voltage, the overcharge detection means feeds the output control signal to the OR circuit.

3. A semiconductor integrated circuit device as claimed in claim 1, wherein an unresponsive circuit for outputting an output of the OR circuit with a delay is provided as the output circuit on an output side of the OR Circuit, and the comparator is connected to a terminal provided to feed an output of the unresponsive circuit to outside the semiconductor integrated circuit device.

4. A semiconductor integrated circuit device comprising;

an OR circuit that receives a first signal generated within the semiconductor integrated circuit device;

an output circuit for processing and then outputting an output signal of the OR circuit;

a plurality of terminals for feeding an output signal of the output circuit to outside the semiconductor integrated circuit device;

a comparator for comparing with a reference voltage a second signal fed from outside to one of the terminals to test the output circuit when the first signal is not being generated; and means for feeding an output of the comparator to the OR circuit.

5. A semiconductor integrated circuit device as claimed in claim 4, wherein the reference voltage is set to be higher than a voltage output from the output circuit and, when the second signal fed in is higher than the reference voltage, the comparator outputs the second signal.

* * * * *